(12) United States Patent
Martini et al.

(10) Patent No.: US 9,203,741 B1
(45) Date of Patent: Dec. 1, 2015

(54) MANAGING MULTI-CUSTOMER NETWORK TRAFFIC USING LOWER LAYER PROTOCOL ATTRIBUTES

(71) Applicant: iboss, Inc., San Diego, CA (US)

(72) Inventors: Paul Michael Martini, San Diego, CA (US); Peter Anthony Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

(21) Appl. No.: 14/516,539

(22) Filed: Oct. 16, 2014

(51) Int. Cl.
  *H04L 12/28* (2006.01)
  *H04L 12/725* (2013.01)
  *H04L 12/741* (2013.01)

(52) U.S. Cl.
  CPC .............. *H04L 45/30* (2013.01); *H04L 45/74* (2013.01)

(58) Field of Classification Search
  None
  See application file for complete search history.

(56) References Cited

U.S. PATENT DOCUMENTS

| | | | |
|---|---|---|---|
| 2002/0029260 A1* | 3/2002 | Dobbins et al. | 709/219 |
| 2006/0239283 A1* | 10/2006 | Fitzgerald | 370/401 |
| 2010/0175122 A1* | 7/2010 | Ballard | 726/12 |
| 2013/0128746 A1* | 5/2013 | Yedavalli | 370/238 |
| 2013/0346564 A1* | 12/2013 | Warrick et al. | 709/219 |

OTHER PUBLICATIONS

Firewall.cx, "VLAN Tagging-Understanding VLANS Ethernet Frames", 2012, downloaded from the internet at: http://www.firewall.cx/networking-topics/vlan-networks/219-vlan-tagging.html on Oct. 7, 2014, 6 pages.
Microsoft, "Network Policy Conditions Properties", 2014, downloaded from the internet at: http://technet.microsoft.com/en-us/library/cc731220(v=ws.10)aspx on Oct. 7, 2014, 4 pages.
Microsoft, "VLAN Attributes Used in Network Policy", 2014, downloaded from the internet at: http://technet.microsoft.com/en-us/library/cc754422(v=ws.10)aspx on Oct. 7, 2014, 1 page.
Network Engineering "What are Tagged and Untagged Packets?", Feb. 25, 2014, downloaded from the internet at: http://networkengineering.stackexchange.com/questions/6483/what-are-tagged-and-untagged-packets on Oct. 7, 2014, 3 pages.
Wikipedia, "IEEE 802.1Q", Sep. 2, 2014, downloaded from the internet at: http://en.wikipedia.org/wiki/IEEE_802.1Q on Oct. 7, 2014, 3 pages.

* cited by examiner

*Primary Examiner* — Otis L Thompson, Jr.
(74) *Attorney, Agent, or Firm* — Fish & Richardson P.C.

(57) ABSTRACT

Methods and systems for managing packets using lower layer protocol attributes include determining a network address and a lower layer protocol attribute associated with a packet and applying a particular network policy to the packet based on the determined network address and the lower layer protocol attribute. The lower layer protocol attribute is associated with a protocol layer lower than a protocol layer associated with the network address.

18 Claims, 5 Drawing Sheets

MANAGING MULTI-CUSTOMER NETWORK TRAFFIC USING LOWER LAYER PROTOCOL ATTRIBUTES

BACKGROUND

This specification generally relates to managing data packets from multiple networks.

A single network provider may manage traffic from multiple customer networks. Devices connected to the customer networks may send network traffic to external networks such as the Internet. Such traffic may include requests for websites, data packets, queries, or other data requests. The network traffic may be associated with network addresses with multiple protocol layers. For example, in the standard Open Systems Interconnection (OSI) protocol model, Ethernet is classified as a layer 2 (data link) protocol, and Internet Protocol is classified as a layer 3 (network) protocol. Generally, protocols at a lower layer of the OSI model encapsulate data at the next layer above.

SUMMARY

In general, one aspect of the subject matter described in this specification may be embodied in systems, and methods performed by data processing apparatuses that include the actions of determining a network address and a lower layer protocol attribute associated with a packet, the lower layer protocol attribute associated with a protocol layer lower than a protocol layer associated with the network address, and applying a particular network policy to the packet based on the determined network address and the lower layer protocol attribute.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Internet service providers often provide internet access or other network access to multiple customer networks. In such configurations, network traffic from the customer networks to resources on the Internet or on other networks are often identified by a source network address associated with the traffic, such as a source Internet Protocol (IP) address in an IP packet. However, because the customer networks are private networks, they may include network addresses from overlapping address ranges, such as IP address ranges reserved for such networks (e.g., "192.168.*.*" or "10.*.*.*"). In such a case, the source address for particular network traffic may not be sufficient to identify from which customer network the traffic originated. Accordingly, applying standard techniques for apply network policies by network address alone may not be sufficient to apply different network policies to traffic from different customer networks.

Accordingly, the present disclosure describes techniques for managing network traffic using lower layer protocol attributes, for example, as identifiers for particular customers One example method includes receiving a packet with a network address and a lower layer protocol attribute, and applying a particular network policy to the packet based on the network address and the lower layer protocol attribute. The lower layer protocol attribute is associated with a particular customer or customer network, and is associated with a protocol layer lower than a protocol layer associated with the network address. By associating a customer or customer network with a particular lower layer protocol attribute, a respective customer network policy may be applied to data packets by identifying the particular lower layer protocol attribute associated with the data packets.

The techniques described herein may provide several advantages. An internet service provider may be able to determine a customer network policy based on a lower layer protocol attribute of a packet, for example, instead of determining a customer network policy based on a network address alone, allowing network traffic from different customer networks to be differentiated and managed according to different policies. Further, the internet service provider may present management interfaces specific to the different customer networks to administrators accessing a network management system from the customer networks, and may present only configuration options and data associated with the administrator's particular customer network.

Figure 1:
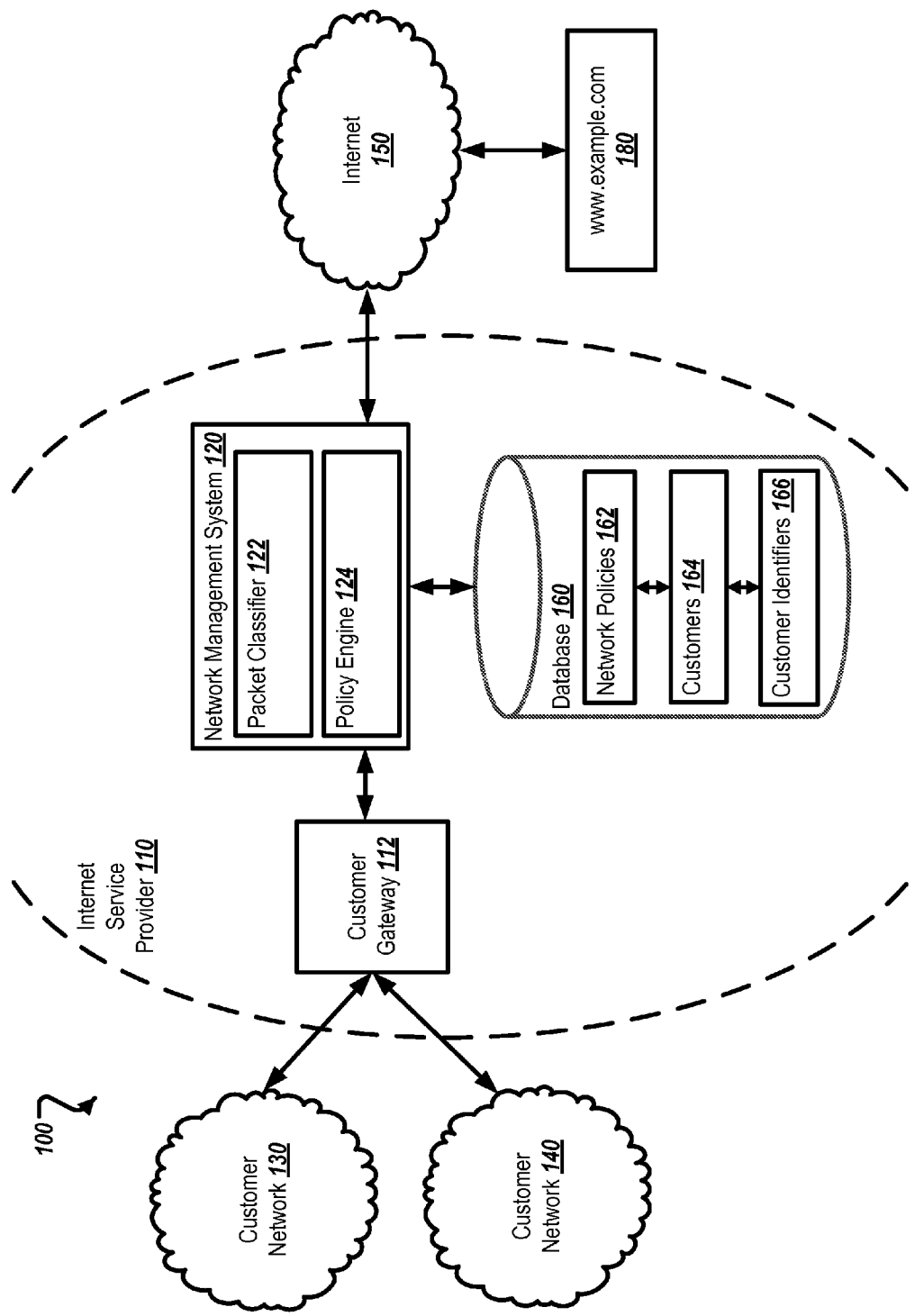
FIG. 1 is a diagram of an example environment.

FIG. 1 is a diagram of an example environment 100. As shown, the example environment 100 includes two customer networks 130 and 140, each connected to a customer gateway 112 of an internet service provider 110. The internet service provider 110 includes a network management system 120. The network management system 120 is connected to a database 160 and the Internet 150. Website 180 is connected to the Internet 150.

In operation, a device within the customer network 130 or customer network 140 sends a packet over the respective customer network 130 or 140 associated with the device. The packet is received by the customer gateway 112 of the internet service provider 110. The customer gateway 112 associates (i.e., tags) the packet with a lower layer protocol attribute that associates the packet with the customer network from which it was received. For example, the customer gateway 112 may associate an IP packet with a protocol attribute at the Ethernet layer, such as a Virtual Local Area Network (VLAN) tag. The customer gateway 112 sends the packet to the network management system 120.

Upon receiving the packet from the customer gateway 112, the network management system 120 identifies the network address and lower layer protocol attribute of the packet, and consults the database 160 to determine information associated with the network address and/or the lower layer protocol attribute. In some implementations, the network address includes an internet protocol (IP) address, and the lower layer protocol attribute includes a Multiprotocol Label Switching (MPLS) tag, an Asynchronous Transfer Mode (ATM) Virtual Path Identifier (VPI), a Virtual Local Area Network (VLAN) tag, a combination of these, or other identifier. In some implementations, the network management system 120 determines a particular customer, a customer hierarchy, a customer network policy, or other information associated with the packet from the identified lower layer protocol attribute and the network address. The network management system 120 may selectively apply a customer network policy to the packet. For example, the network management system 120 may block, allow, redirect, or otherwise manage the packet based on the configuration of the associated customer network policy.

As shown, the environment 100 includes customer networks 130 and 140. In some implementations, the customer networks 130 and 140 may be wireless or wired networks provided by a corporation, educational institution, municipality, business, or other entity. Such a networks may utilize any standard networking technology, including 802.11a, 802.11b, 802.11g, 802.11n, LTE, WiMax, CDMA, Ethernet or any other suitable networking technology. In such implementations, the network may be a public wireless network in the sense that any device within range may connect to the network. In some implementations, the entity or entities that control either or both the customer networks 130 and 140 may issue devices to users for use on the respective customer network 130 or 140.

The customer networks 130 and 140 may include one or more devices connected to the respective network. In some implementations, the one or more devices include mobile devices, such as cellular telephones, smartphones, tablets, laptops and other similar computing devices. The one or more devices may also include wired devices such as desktop computers. The one or more devices may also include servers. In some implementations, the one or more devices include personal devices associated with one or more users. The one or more devices may also include devices issued or owned by an entity that provides one of the customer network 130 or customer network 140, such as company-issued smartphones or laptops. In some implementations, the one or more devices may include network access or web browsing software (e.g., a web browser) for accessing resources on the Internet 150.

The customer gateway 112 is connected to customer networks 130 and 140. In some implementations, the customer gateway 112 is a router or other component for managing and routing packets sent to the internet service provider 110. As described above, the customer gateway 112 is operable to receive packets from the customer networks 130 and 140, and mark each packet with one or more lower layer protocol attributes, such as, for example, a VLAN tag. The lower level protocol attributes are discussed in greater detail below. The network management system 120 is connected to the customer gateway 112 and operable to receive the marked packets from the customer gateway 112. The network management system 120 is operable to determine a network address and lower layer protocol attribute for each packet, determine a customer for each packet based on the network address and lower layer protocol attribute of each packet, and apply a respective customer network policy to each packet. Applying the customer network policy may include operations such as blocking the packet, allowing the packet, redirecting the packet, logging the packet, notifying an entity associated with the particular network policy, or other operations. In some implementations, the network management system 120 may be a server or set of servers connected to the customer gateway 112, or may, in some cases, be an integrated component within the customer gateway 112.

The network management system 120 includes a packet classifier 122. In operation, the packet classifier 122 may receive marked packets from the customer gateway 112 and identify the lower layer protocol attribute marking each packet. The packet classifier 122 may consult one or more or each of the network policies 162, customers 164, or customer identifiers 166 stored in the database 160 to identify and determine customer information associated with each lower layer protocol attribute. Customer information may include, for example, a customer, a customer network, a customer network policy, a respective entity within a customer network or other network, a customer hierarchy, or a combination of entities, groups, or networks. For example, the customer identifiers 166 may specify associations between a lower layer protocol attribute and a customer, the customers 164 may specify a customer from a set of customers and respective customer information, and the network policies 162 may specify managing operations on a packet. In such a configuration, the packet classifier 122 may respond to a packet including the lower layer protocol attribute by identifying a customer association between the lower layer protocol attribute and a customer, identifying the corresponding customer, and identifying a corresponding network policy for that customer.

The network management system 120 also includes a policy engine 124. In operation, the policy engine 124 enforces a network policy on a packet, for example, by applying network policy operations on a packet based on the customer information determined by the packet classifier 122. The policy engine 124 may consult the network policies 162 in the database 160 to determine network policy operations to apply to the packet. Based on the lower layer protocol attribute, packet classifier 122 may determine how to handle the packet, and the policy engine 124 enforces the operations decided by the packet classifier. For example, the policy engine 124 may identify a network policy 162 associated with the lower layer protocol attribute. The policy engine 124 may determine that the network policy 162 associated with the lower layer protocol attribute indicates the policy engine 124 should block a packet, redirect a packet, or allow a packet, for example, to be forwarded to a website (e.g., <www.example.com> 180) via Internet 150.

In some implementations, including when a packet includes a request to perform an administrative action, the policy engine 124 may restrict a scope of the administrative action to resources associated with a particular customer, or entity within a customer, represented by the lower layer protocol attribute. In some cases, the administrative action can include setting a configuration parameter associated with the particular customer or entity, providing information associated with the particular entity, a combination of these, or other administrative action. For example, setting a configuration parameter may include changing attributes of a network policy in the network policies 162. In some cases, restricting the scope of the administrative action to resources associated with the particular customer can include blocking requests to set configuration parameters associated with customers or entities different that the particular customer or entity.

Although the packet classifier 122 and the policy engine 124 are shown as separate components, in some implementations the two components may be combined. In some cases, the two components may be separate modules within a single software process. The packet classifier 122 and policy engine 124 may also be located on separate servers, for example, connected to one of the customer networks 130 or 140. The packet classifier 122 or policy engine 124 (or both) may be in communication with one or more customer network policy servers to which customer network policies are pointed. The customer network policy servers may communicate with the packet classifier 122 or policy engine 124 (or both) in order to determine how to handle received packets.

The database 160 is connected to the network management system 120. In some implementations, the database 160 may be stored on the same server as the network management system 120. The database 160 may also be stored on a separate server and accessed by the network management system 120 over a network. The database 160 may be any proprietary or commercially available database system or format, including, but not limited to, MySQL®, Microsoft® SQLServer, IBM® DB2, Oracle®, SQLite, or any other suitable database system or format. The database 160 may also be a distributed database running on a plurality of servers. In some implementations, the database 160 may be a configuration file or set of configuration files associated with the network management system 120.

Database 160 also includes customers 164 and customer identifiers 166. In some implementations, the customers 164 includes a bank of customers, each customer associated with particular customer networks (e.g., customer networks 130 and 140) associated with the internet service provider 110. In some implementations, a customer 164 may specify a particular network policy from the network policies 162 for traffic directed from a particular customer network. In some implementations, the customer identifiers 166 include network addresses and the lower layer protocol attributes associated with customers 164. For example, a particular customer identifier in the customer identifiers 166 may specify a particular customer within the customers 164, and therefore specify a particular network policy within the network policies 162. The particular network policy may specify, for example, that packets requesting for the domain name "www.example.com" 180 should be allowed, blocked, or redirected based on the particular network policy.

Figure 2:
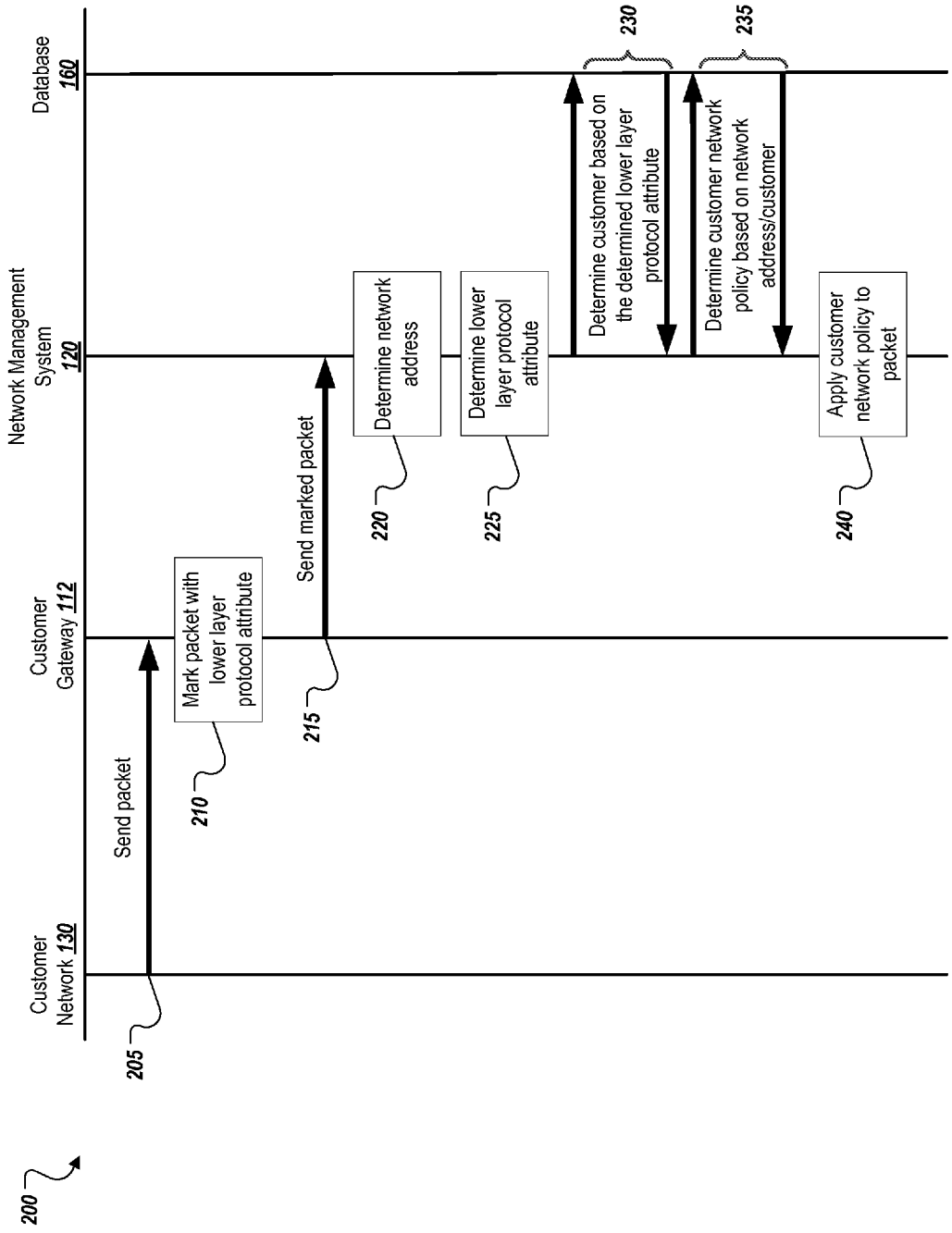
FIG. 2 is a message flow diagram of an example interaction between the components of the example environment to manage a packet using lower layer protocol attributes.

FIG. 2 is a message flow diagram of an example interaction 200 between the components of the example environment 100 to manage data packets using lower layer protocol attributes. At 205, the customer network 130 sends a packet (e.g., data packet for "www.example.com") to the customer gateway 112. At 210, the customer gateway 112 marks the packet with a lower layer protocol attribute. At 215, the customer gateway 112 sends the marked packet to the network management system 120. At 220, the network management system 120 determines the network address of the marked packet. At 225, the network management subsystem 120 determines the lower layer protocol attribute of the marked packet. At 230, the network management system 120 consults the database 160 to determine the customer based on the determined lower layer protocol attribute. At 235, the network management subsystem consults the database 160 to determine the customer network policy based on the network address, the customer, or other detail of the packet or combination of details of the packet. At 240, the network management system 120 applies the customer network policy to the packet. The customer network policy can include, for example, blocking the packet, allowing the packet, redirecting the packet, logging the packet, notifying an entity associated with the customer network policy, or other operation or combination of operations associated with the customer network policy. In some implementations, blocking the packet may include dropping the packet. Blocking the packet may also include returning a response to the customer network 130 indicating that the packet has been blocked.

Figure 3:
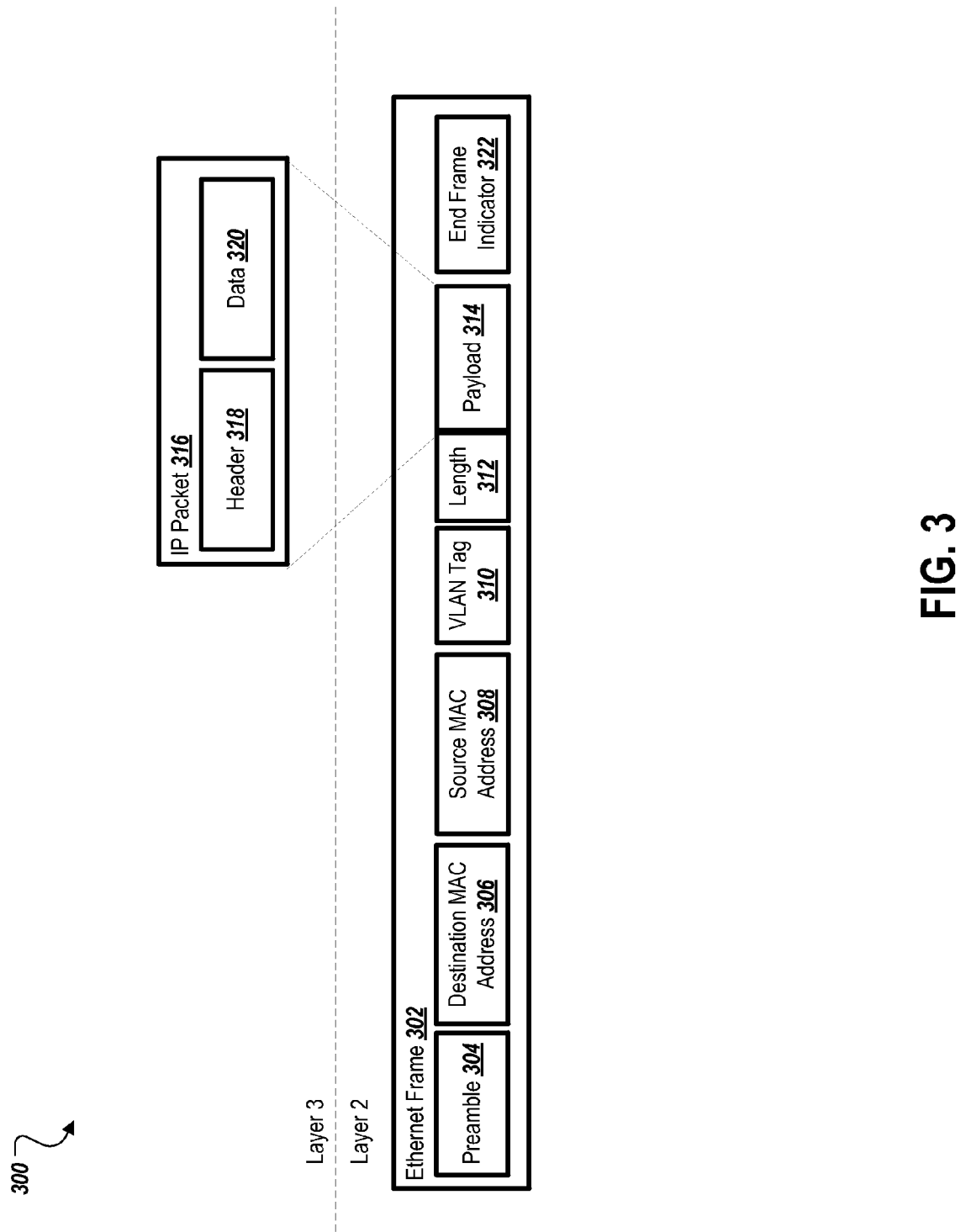
FIG. 3 is a schematic of an example packet that can be used in the example environment of FIG. 1 and the example interaction of FIG. 2.

FIG. 3 is a schematic of an example packet 300 that can be used in the example environment 100 of FIG. 1 and the example interaction 200 of FIG. 2. The example packet 300 (e.g., Ethernet packet) includes an Ethernet frame 302 with several data blocks spanning multiple protocol layers. Although the schematic shows only Layer 2 and Layer 3 of the protocol layers, the example packet 300 can span more than two protocol layers, for example, Layers 1, 2, and 3. In the example packet 300, the Ethernet frame 302 includes a preamble 304, a destination media access control (MAC) address 306, a source MAC address 308, a lower layer protocol attribute in the form of a VLAN tag 310, a length 312, a payload 314, and an end frame indicator 322. The preamble 304 marks the beginning of Ethernet frame 302. The payload 314 includes an IP packet 316 with a header 318 and data 320, for example, including an IP address for the packet 300. The VLAN tag 310 is within Layer 2 of the protocol layers, while the IP packet 316 (e.g., including the IP address of the example packet) is within Layer 3 In some cases, a network management system (e.g., network management system 120 of FIGS. 1 and 2) may identify a customer (e.g., within customers 164) based on the VLAN tag at Layer 2 with or without accessing data on Layer 3 of the packet.

Figure 4:
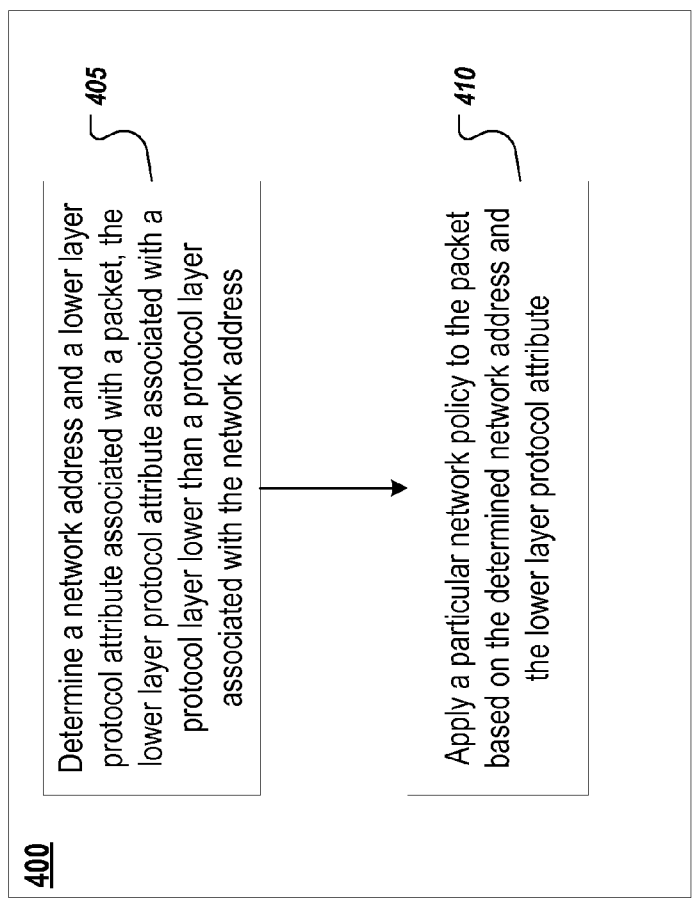
FIG. 4 is a flow chart of an example process of managing a packet using lower layer protocol attributes.

FIG. 4 is a flow chart of an example process 400 of managing data packets using lower layer protocol attributes. At 405, a network address and a lower layer protocol attribute associated with a packet are determined, the lower layer protocol attribute associated with a protocol layer lower than a protocol layer associated with the network address. In some implementations, the network address includes an internet protocol (IP) address and the lower layer protocol attributes includes at least one of a Multiprotocol Label Switching (MPLS) tag, an Asynchronous Transfer Mode (ATM) Virtual Path Identifier (VPI), a Virtual Local Area Network (VLAN) tag, or other attribute or combination of attributes. At 410, a particular network policy is applied to the packet based on the determined network address and the lower layer protocol attribute. In some implementations, applying the particular network policy to the packet based on the network address and the lower layer protocol attribute includes at least one of blocking the packet, allowing the packet, redirecting the packet, logging the packet, notifying an entity associated with the particular network policy, or other network policy operation or combination of operations.

In some cases, the packet is a request to perform an administrative action, and applying the particular network policy includes restricting a scope of the administrative action to resources associated with a particular entity represented by the lower layer protocol attribute. In some implementations, the administrative action includes setting a configuration parameter associated with the particular entity, and restricting the scope includes blocking requests to set configuration parameters associated with entities different than the particular entity. In certain implementations, setting the configuration parameter includes changing attributes of a network policy. In some cases, the administrative action includes providing information associated with the particular entity, and restricting the scope includes blocking requests for information associated with entities different than the particular entity.

In some cases, the packet is a first packet, the particular network policy is a first network policy, the network address is a first network address, and the lower layer protocol attribute is a first lower layer protocol attribute. In such cases, the example process 300 may include determining a second network address and a second lower layer protocol attribute associated with a second packet different than the first packet, the second lower layer protocol attribute being different than the first lower layer protocol attribute, and applying a second network policy to the second packet based on the second network address and the second lower layer protocol attribute, the second network policy being different than the first network policy.

Figure 5:
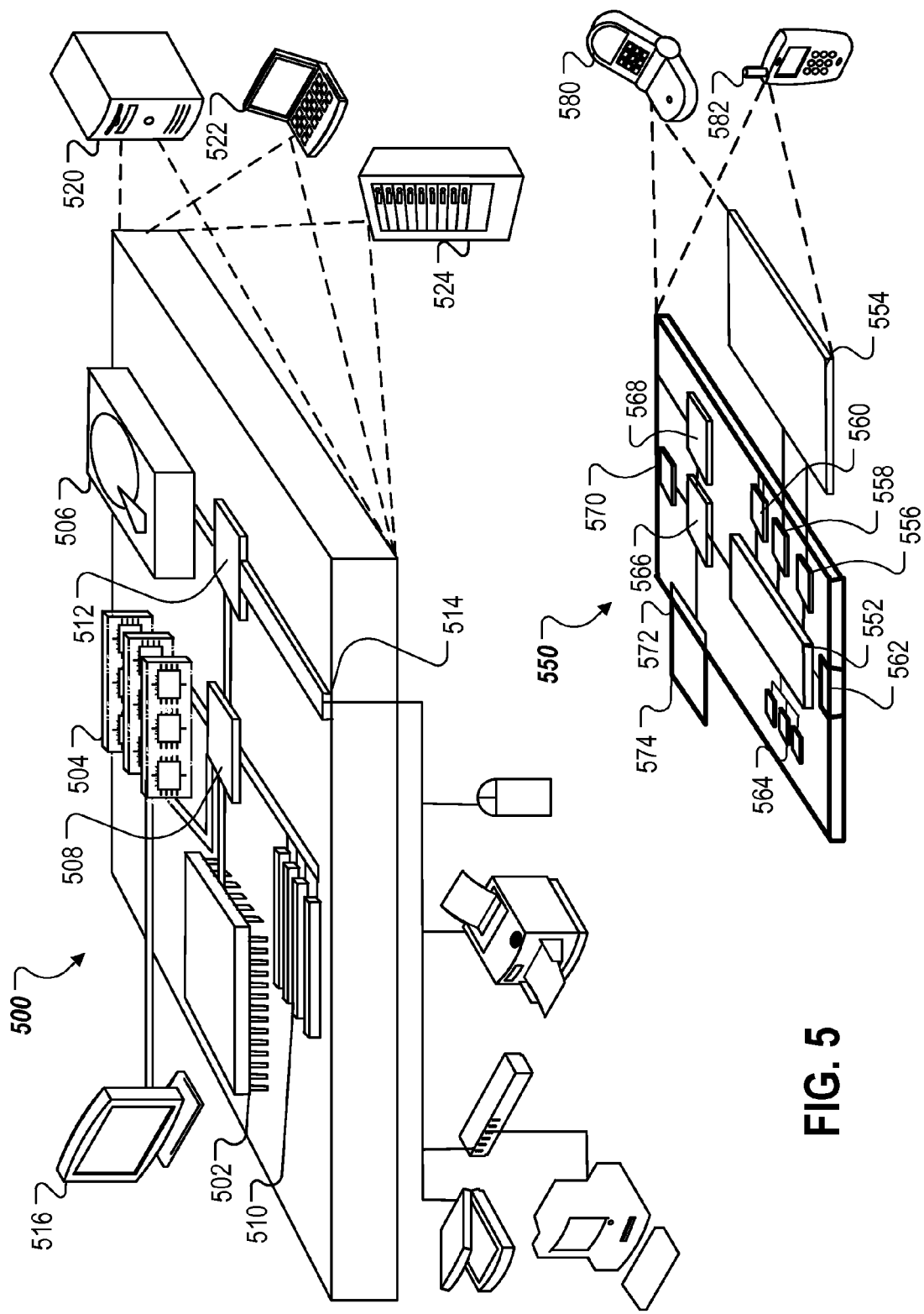
FIG. 5 is a diagram of computing devices that may be used to implement the systems and methods described in this document.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 510 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method executed by one or more processors, the method comprising:
   determining a network address and a lower layer protocol attribute associated with a packet, the lower layer protocol attribute associated with a protocol layer lower than a protocol layer associated with the network address, wherein the packet is a request to perform an administrative action; and
   applying a particular network policy to the packet based on the determined network address and the lower layer protocol attribute, wherein applying the particular network policy includes restricting a scope of the administrative action to resources associated with a particular entity represented by the lower layer protocol attribute.

2. The method of claim 1, wherein the packet is a first packet, the particular network policy is a first network policy, the network address is a first network address, and the lower layer protocol attribute is a first lower layer protocol attribute, the method further comprising:

determining a second network address and a second lower layer protocol attribute associated with a second packet different than the first packet, the second lower layer protocol attribute being different than the first lower layer protocol attribute; and applying a second network policy to the second packet based on the second network address and the second lower layer protocol attribute, the second network policy being different than the first network policy.

3. The method of claim 1, wherein the network address includes an internet protocol (IP) address and the lower layer protocol attributes includes at least one of a Multiprotocol Label Switching (MPLS) tag, an Asynchronous Transfer Mode (ATM) Virtual Path Identifier (VPI), or a Virtual Local Area Network (VLAN) tag.

4. The method of claim 1, wherein applying the particular network policy to the packet based on the network address and the lower layer protocol attribute includes at least one of blocking the packet, allowing the packet, redirecting the packet, logging the packet, or notifying an entity associated with the particular network policy.

5. The method of claim 1, wherein the administrative action includes setting a configuration parameter associated with the particular entity, and restricting the scope includes blocking requests to set configuration parameters associated with entities different than the particular entity.

6. The method of claim 5, wherein setting the configuration parameter includes changing attributes of a network policy.

7. The method of claim 1, wherein the administrative action includes providing information associated with the particular entity, and restricting the scope includes blocking requests for information associated with entities different than the particular entity.

8. A non-transitory, computer-readable medium storing instructions operable when executed to cause at least one processor to perform operations comprising:

determining a network address and a lower layer protocol attribute associated with a packet, the lower layer protocol attribute associated with a protocol layer lower than a protocol layer associated with the network address, wherein the packet is a request to perform an administrative action; and applying a particular network policy to the packet based on the determined network address and the lower layer protocol attribute, wherein applying the particular network policy includes restricting a scope of the administrative action to resources associated with a particular entity represented by the lower layer protocol attribute.

9. The computer-readable medium of claim 8, wherein the packet is a first packet, the particular network policy is a first network policy, the network address is a first network address, and the lower layer protocol attribute is a first lower layer protocol attribute, the operations further comprising:

determining a second network address and a second lower layer protocol attribute associated with a second packet different than the first packet, the second lower layer protocol attribute being different than the first lower layer protocol attribute; and applying a second network policy to the second packet based on the second network address and the second lower layer protocol attribute, the second network policy being different than the first network policy.

10. The computer-readable medium of claim 8, wherein the network address includes an internet protocol (IP) address and the lower layer protocol attributes includes at least one of a Multiprotocol Label Switching (MPLS) tag, an Asynchronous Transfer Mode (ATM) Virtual Path Identifier (VPI), or a Virtual Local Area Network (VLAN) tag.

11. The computer-readable medium of claim 8, wherein applying the particular network policy to the packet based on the network address and the lower layer protocol attribute includes at least one of blocking the packet, allowing the packet, redirecting the packet, logging the packet, or notifying an entity associated with the particular network policy.

12. The computer-readable medium of claim 8, wherein the administrative action includes setting a configuration parameter associated with the particular entity, and restricting the scope includes blocking requests to set configuration parameters associated with entities different than the particular entity.

13. The computer-readable medium of claim 12, wherein setting the configuration parameter includes changing attributes of a network policy.

14. The computer-readable medium of claim 8, wherein the administrative action includes providing information associated with the particular entity, and restricting the scope includes blocking requests for information associated with entities different than the particular entity.

15. A system comprising:

memory for storing data; and one or more processors operable to perform operations comprising:

determining a network address and a lower layer protocol attribute associated with a packet, the lower layer protocol attribute associated with a protocol layer lower than a protocol layer associated with the network address, wherein the packet is a request to perform an administrative action; and applying a particular network policy to the packet based on the determined network address and the lower layer protocol attribute, wherein applying the particular network policy includes restricting a scope of the administrative action to resources associated with a particular entity represented by the lower layer protocol attribute.

16. The system of claim 15, wherein the packet is a first packet, the particular network policy is a first network policy, the network address is a first network address, and the lower layer protocol attribute is a first lower layer protocol attribute, the operations further comprising:

determining a second network address and a second lower layer protocol attribute associated with a second packet different than the first packet, the second lower layer protocol attribute being different than the first lower layer protocol attribute; and applying a second network policy to the second packet based on the second network address and the second lower layer protocol attribute, the second network policy being different than the first network policy.

17. The system of claim 15, wherein the network address includes an internet protocol (IP) address and the lower layer protocol attributes includes at least one of a Multiprotocol Label Switching (MPLS) tag, an Asynchronous Transfer Mode (ATM) Virtual Path Identifier (VPI), or a Virtual Local Area Network (VLAN) tag.

18. The system of claim 15, wherein applying the particular network policy to the packet based on the network address and the lower layer protocol attribute includes at least one of blocking the packet, allowing the packet, redirecting the packet, logging the packet, or notifying an entity associated with the particular network policy.

* * * * *